US008457200B2

(12) United States Patent
Andersson et al.

(10) Patent No.: US 8,457,200 B2
(45) Date of Patent: Jun. 4, 2013

(54) VIDEO DATA MANAGEMENT

(75) Inventors: Kenneth Andersson, Gävle (SE); Rickard Sjöberg, Tumba (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 816 days.

(21) Appl. No.: 12/307,861

(22) PCT Filed: Jun. 29, 2007

(86) PCT No.: PCT/SE2007/000640
§ 371 (c)(1),
(2), (4) Date: Jan. 7, 2009

(87) PCT Pub. No.: WO2008/004940
PCT Pub. Date: Jan. 10, 2008

(65) Prior Publication Data
US 2009/0257492 A1    Oct. 15, 2009

Related U.S. Application Data

(60) Provisional application No. 60/818,981, filed on Jul. 7, 2006, provisional application No. 60/852,427, filed on Oct. 18, 2006.

(51) Int. Cl.
*H04N 7/12* (2006.01)
(52) U.S. Cl.
USPC ........... 375/240.12; 375/240.13; 375/E7.026; 375/E7.243; 382/232; 382/236; 382/238; 382/239
(58) Field of Classification Search
USPC .... 375/240.12–13, E7.026, E7.243; 382/232, 382/236, 238–239
See application file for complete search history.

(56) References Cited

U.S. PATENT DOCUMENTS

| | | |
|---|---|---|
| 2005/0259736 A1 | 11/2005 | Payson |
| 2005/0276323 A1 | 12/2005 | Martemyanov et al. |
| 2010/0246674 A1* | 9/2010 | Park et al. ................ 375/240.13 |

FOREIGN PATENT DOCUMENTS

| | | |
|---|---|---|
| WO | WO 0135657 | 5/2001 |
| WO | WO 2004064255 A2 | 7/2004 |
| WO | WO 2005/041112 A2 | 5/2005 |

OTHER PUBLICATIONS

Reference frame modification techniques for temporal and spatial scalability Amir Naghdinezhad, Fabrice Labeau. Image Communication Nov. 2012. vol. 27,Iss.10;Source: ACM Digital Library Core Package.*

(Continued)

*Primary Examiner* — Andy S. Rao
*Assistant Examiner* — Angela Holmes

(57) ABSTRACT

The invention relates to encoding and decoding pixel blocks of a video frame through a hybrid mode involving usage of a first prediction of a pixel block and at least a second prediction of the pixel block. An initial first weighting factor is modified using a factor modifier to generate a first weighting factor comprising multiple different factor values that are assignable to the different pixel-based first prediction values of the first prediction. The first weighting factor is applied to the first prediction and a second weighting factor is applied to the second block prediction. The at least two weighted predictions are then combined to form a hybrid prediction of the current pixel block.

31 Claims, 10 Drawing Sheets

OTHER PUBLICATIONS

.Decoder-driven mode decision in a block-based distributed video codec Stefaan Mys, Jürgen Slowack, Jozef Škorupa, Nikos Deligiannis, Peter Lambert, Adrian Munteanu, Rik Walle. Multimedia Tools and Applications May 2012. vol. 58,Iss.1;Source: ACM Digital Library Core Package.*

Text of ISO/IEC 14496-10 FCD Advanced Video Coding. ITU Study Group 16—Video Coding Experts Group—ISO/IEC MPEG & ITU-T VCEG (ISO/IEC JTC1/SC29/WG11 and ITU-T SG16 Q6). No. N4920. Aug. 11, 2002.

* cited by examiner

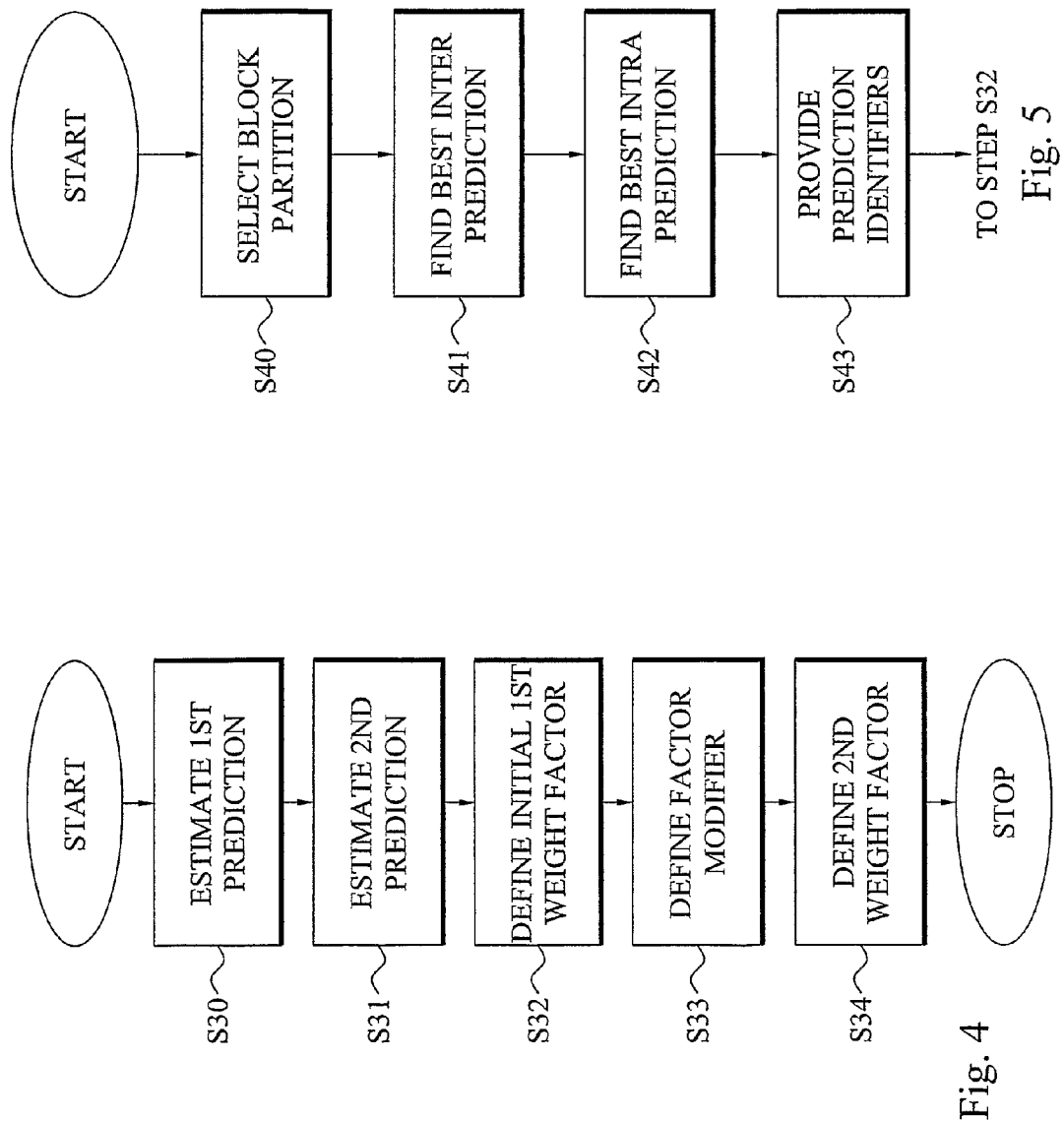

VIDEO DATA MANAGEMENT

This application claims the benefit of U.S. Provisional Application No. 60/818,981, filed Jul. 7, 2006, and U.S. Provisional Application No. 60/852,427, filed Oct. 18, 2006, the disclosures of which is fully incorporated herein by reference.

TECHNICAL FIELD

The present invention generally relates to video data management, and in particular to encoding and decoding of video sequences.

BACKGROUND

Pixel or image element prediction is an important part of video coding standards such as H.261, H.263, MPEG-4 and H.264 [1]. In H.264 there are three pixel prediction methods utilized, namely intra, inter and bi-prediction. Intra prediction provides a spatial predicition of the current block from previously decoded pixels of a current frame. Inter prediction gives a temporal prediction of the current block using a corresponding but displaced block in a previously decoded frame.

Multiple reference pictures may be used for inter predicition with a reference picture index to indicate which of the multiple reference pictures is used. In the P-type of inter encoding, only single directional predicition is used, and the allowable reference pictures are managed in list 0. However, in B-type of inter encoding, two lists of reference pictures are managed, list 0 and list 1. In such B-type pictures, single directional predicition using either list 0 or list 1 is allowed, or bi-predicitions using an average of a reference picture from list 0 and another reference picture from list 1.

The weighted prediction in H.264 represents a weight for respectively bi-directional predicition and also a DC offsets for the weighted combination in the slice header. The general formula for using weighting factors in inter prediction is:

$$P=((w_0 * P_0 + w_1 * P_1) >> \text{Shift}) + DC \quad (1)$$

where $P_0$ and $w_0$ are the list 0 initial predictor and weighting factor and $P_1$ and $w_1$ are the list 1 initial predictor and weighting factor. DC represents an offset that is defined per frame basis and Shift is a shifting factor. In the case of bi-directional prediction $w_0 = w_1 = 0.5$.

Document [2] suggests a hybrid intra-inter bi-predictive coding mode that allows both intra and inter frame predictions to be combined together for hybrid-encoding a macroblock. In this hybrid coding, an average of selected intra and inter predictions or a differently weighted combination of the intra and inter predictions is used.

SUMMARY

The hybrid coding suggested in [2] basically uses a summing of the two input intra and inter predictions or uses slice-specific weights. Thus, a same weight is applied to all pixels in all macroblocks of slice that is used as inter and/or intra prediction. This is far from optimal from the image quality point of view.

The present invention overcomes these and other drawbacks of the prior art arrangements.

It is a general object of the present invention to provide an efficient video frame encoding and decoding.

It is another object of the present invention to provide a hybrid encoding and decoding involving spatial and/or temporal predictions.

These and other objects are met by the invention as defined by the accompanying patent claims.

Briefly, the present invention involves a hybrid mode for encoding and decoding a group of image elements in a video sequence. The hybrid mode involves the usage of at least two predictions of the image element group and the usage of image element specific weighting factor values, where the weighting factor values are representative of the relative uncertainty of the predicted values.

An initial first weighting factor is provided for the current group. This initial first weighting factor is modified by a factor modifier to generate a first weighting factor comprising multiple different factor values that will be used for modifying image element values of a first prediction. The weighting factor modification generates a weighting factor that could reflect the relative uncertainty in the image element values of the first prediction. In a preferred embodiment, this first prediction is an intra prediction. In such a case, image element portions of the current image element group that are spatially closer to the intra prediction in the video frame can therefore be assigned higher weighting factor values as compared to more spatially remote image elements in the current group. The modified weighting factor can also have weighting factor values giving higher weights to image element positions representing high contrast objects, such as lines and edges, in the image element group.

A corresponding second weighting factor is also provided for a second group prediction in the hybrid mode. In the decoding, the generated first weighting factor is applied to the first prediction and the second weighting factor is applied to the second group prediction. A decoded version of the image element group is then calculated from these two weighted predictions.

The second prediction can be an intra prediction, an inter prediction or indeed constitute multiple different intra and/or inter predictions.

The present hybrid processing therefore provides a prediction mechanism that combines different prediction paths, such spatial and temporal paths or multiple different spatial paths, to improve video coding efficiency. The hybrid mode also allows the provision of an inter prediction with an intra prediction refresh to improve error resilience. The image element or pixel specific weight values of the intra weighting factor radically improve the coding/decoding quality of the present invention as compared to prior art solutions.

SHORT DESCRIPTION OF THE DRAWINGS

The invention together with further objects and advantages thereof, may best be understood by making reference to the following description taken together with the accompanying drawings, in which:

FIG. 4 is a flow diagram illustrating a method of encoding a group of image elements of a video sequence frame according to the present invention;

FIG. 5 is a flow diagram illustrating the first and second prediction estimating steps of the encoding method in FIG. 4 in more detail according to an embodiment of the present invention;

DETAILED DESCRIPTION

Figure 1:
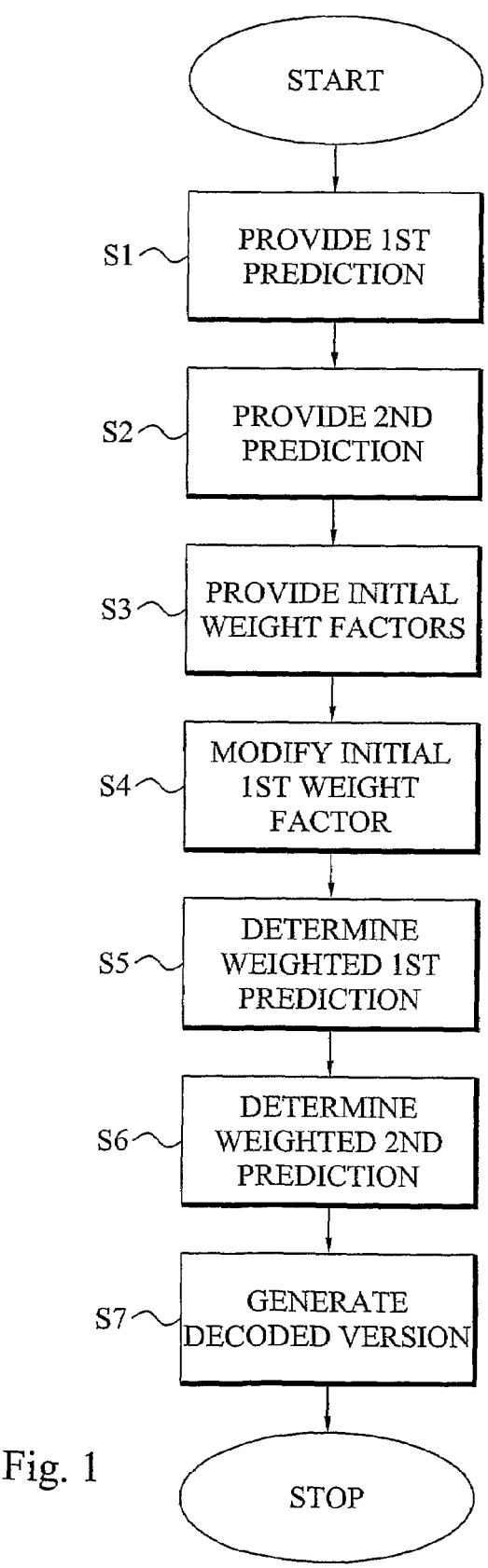
FIG. 1 is a flow diagram illustrating a method of decoding a group of image elements of a video sequence frame according to the present invention.

Throughout the drawings, the same reference characters will be used for corresponding or similar elements.

The present invention generally relates to encoding and decoding groups of image elements of a frame in a video sequence.

In the present invention, a video sequence comprises one or multiple, i.e. at least two, frames or pictures. Such a frame can in turn be regarded as composed of a series of one or more slices, where such a slice consists of one or more macroblocks of image elements or pixels. In the present invention, the expression "image element" is used to denote a smallest element of a frame or picture in a video sequence. Such an image element has associated image element properties, such as color (in the red, green, blue, RGB, space) or luminance (Y) and chrominance (Cr, Cb or sometimes denoted U, V). A typical example of an image element is a pixel of a frame or picture.

The image elements are organized into groups of image elements. The expression "group of image element" denotes any of the prior art known partitions of frames and slices into collections of image elements that are handled together during decoding and encoding. Generally, such a group is a rectangular (M×N) or square (M×M) group of image elements. In the art such a grouping are generally denoted macroblock in the video compression standard. Such a macroblock generally has a size of 16×16 image elements. A macroblock can consists of multiple so-called sub-macroblock partitions, such as 16×8, 8×16, 8×8, 8×4, 4×8 and 4×4 image elements. The 8×8 sub-macroblock partition is often denoted as a sub-macroblock or sub-block. In the present invention, the expression group of image elements is used to denote any such macroblock, sub-macroblock or partition size or actually any other grouping of image elements used in video compression unless explicitly notified otherwise. A typical example could be that the luminance component of a macroblock comprises 16×16 pixels arranged as an array of four 8×8 blocks and that the associated chrominance components are spatially sub-sampled by a factor of two in the horizontal and vertical directions to form 8×8 blocks.

FIG. 1 is flow diagram illustrating a method of decoding a group of image elements in a frame of an encoded video sequence. This image element group has previously been encoded using a hybrid encoding method that involves usage of a combination of a first prediction and at least one further prediction. In a preferred embodiment of the invention, the first prediction is an intra prediction, while the second prediction is an inter prediction, such as an inter prediction of the P (predictive) type or the B (bi-predictive) type. The second prediction could also be a second intra prediction. In the following, the present invention is mainly described further in connection with using two predictions in the hybrid encoding/decoding. However, the present invention is not limited thereto but can utilize three or more different predictions of an image element group. For example, the hybrid mode can use 1 intra and 1 inter prediction, N intra predictions, M inter predictions, N intra and 1 inter predictions, 1 intra and M inter predictions or M intra and N inter predictions, where M, N are positive integers larger than one.

The method starts in step S1, where a first (intra or inter, preferably intra) prediction is provided for a group of image elements to be decoded. This first prediction is preferably provided based on a prediction identifier or mode identifier associated with the image element group. As is known in the art, there are generally multiple intra modes that can be used for an image element group. For example, a 4×4 block can use one of nine intra prediction modes, where one of these is a DC prediction and the other eight defines different directions of spatial predictions to use. Correspondingly, a 16×16 block typically has four intra prediction modes, one DC mode and three that defines different prediction directions.

Figure 14:
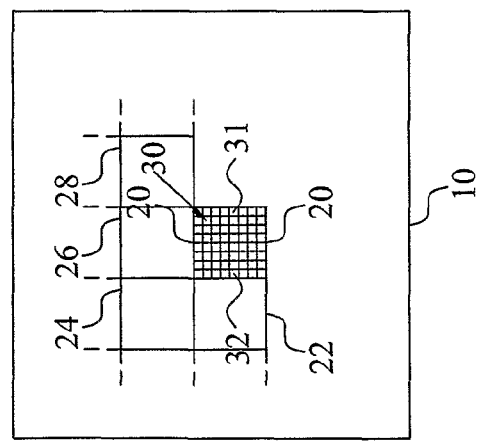
FIG. 14 is a schematic representation of an image frame.

Therefore step S1 preferably uses such a mode or type identifier for providing a first (intra) prediction. If the mode identifier signals an intra mode that uses a prediction direction, the step S1 involves providing the intra prediction based on a decoded version of at least one encoded image element group of the same frame as the current image element group. This at least one group is preferably a previously decoded neighboring group in the frame. FIG. 14 schematically illustrates this situation. The figure illustrates a frame 10 containing a group 20 of image elements 30 that is to be decoded. The figure also illustrates four neighboring image element groups 22, 24, 26, 28 that have already been decoded. The provision of step S1 can then utilize color or chrominance/luminance values previously calculated for one or more of these neighboring groups 22, 24, 26, 28 to provide the intra prediction of the current group 20. A first such mode could use only image element values of a single neighboring group, such as the one above 26 or to the left 22 of the current group 20. While other modes use image element values from several different neighboring groups 22, 24, 26, 28.

Figure 13:
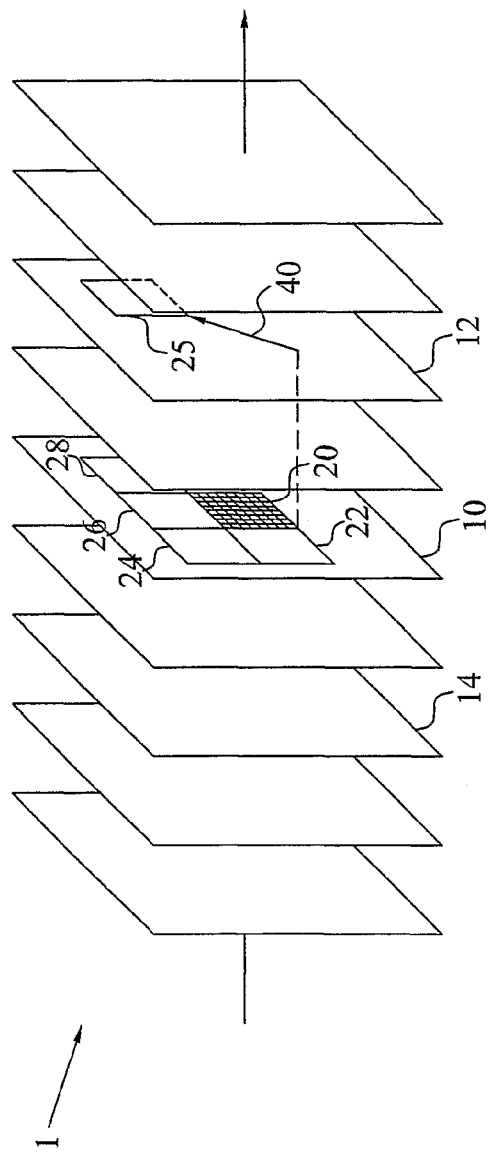
FIG. 13 is a schematic representation of a video sequence of image frames.

If instead an inter prediction is to be provided in step S1, the prediction is preferably generated based on image element values of a group of another frame (P type) or multiple other frames (B type). In such a case, the image element group is associated with a frame index allowing identification of this other frame in the video sequence and a motion vector that is a displacement vector allowing identification of the group in the other frame used for inter prediction. FIG. 13 illustrates this scenario. A current frame 10 comprises an image element group to be decoded according to the invention. Another frame such as a previous frame 12 in the stream 1 or a following frame 14. The arrow 40 denotes the motion vector that allows identification of the image element group 25 in the other frame 12 to use as inter prediction in step S1 of FIG. 1.

A next step S2 provides a second prediction for the current image element group. As mentioned in the foregoing, this prediction can be an intra prediction or an inter prediction. The step S2 can also involve providing multiple other predictions for the image element group. This step S2 is generally performed in a similar as described above, depending on whether the second prediction is an intra or inter prediction.

A next step S3 provides initial weighting factors to use for modifying the first prediction provided in step S1 and the second prediction provided in step S2. The weighting factors can be adapted and transmitted on different levels of detail, for example using one weight factor pair or set (in the case of using more than two predictions in the hybrid decoding) per video sequence, per frame, per slice, per macroblock or per sub-macroblock (partition). Generally, the finer level of detail the higher resulting quality. However, this higher level of detail also means that the total size of the frames in terms of number of bits will increase. The present invention preferably uses group specific weight pairs or weight sets, i.e. one such pair or set per macroblock or sub-macroblock in the frames. However, for a general video sequence, not all image element groups in all frames must necessarily be encoded and decoded according to the present invention. Instead it is typically expected that several image element groups will be handled as prior art intra blocks, inter blocks, including inter P block and inter B blocks. Therefore, the usage of group-specific weights will not impose a dramatically increased frame size. Thus, a video sequence of the present invention comprises at least one frame with at least one image element group decoded and encoded according to the present invention.

The provision of initial weight factors of step S3 involves providing an initial first weighting factor and at least another weighting factor. The two factors could have the same factor values or different factor values. Preferably at least one and more preferably both weighting factors are non-zero. Generally, the weighting factor comprises one factor value each but could alternatively comprise multiple factor values, e.g. organized in a vector or matrix. In the latter case, each image element of the current group could have an associated factor value of the weight factors.

A next step S4 modifies at least the initial first weighting factor provided in step S3. This modification is performed using a factor modifier that is applied to, such as multiplied or added to, the initial first weight factor. This results in the generation of a first weighting factor that comprises multiple factor values. The first weighting factor preferably comprises one factor value for each image element in the group. One or more of the factor values may be the same, though not all values are identical. This means that each factor value is associated with an image element position in the image element group. As a consequence, the respective factor values are to be applied to different image element predictions from the first prediction provided in step S1, as is further described below.

In a preferred embodiment, the generated factor values are dependent on their associated relative image element position in the group of image elements. This allows weighting the different weighting factors differently depending on how reliable the first predictions are in different image element positions and/or special local structures in the group. This means that weight factor values can be modified according to position within the image element group to consider uncertainty of the first prediction and/or local structures or contrasts in the prediction.

As was described in the foregoing, an intra prediction preferably assigns image element values to the image elements in the current group, where these values comes from image elements in one or more neighboring groups in the frame. Generally, the further away (in terms of the number of intermediate image elements) a given image element is in the current group from the image element(s) in the neighboring group(s) that was (were) used as intra prediction for the given image element, the less accurate the assigned image element value is.

The usage of the factor modifier of the present invention combats the prior art problems arising due to the usage of the same weighting factor values for all intra prediction values in an image element groups as was done in the document [2]. The present invention solves that problem by applying a comparatively higher intra weight factor value for an image element that is close to its intra prediction origin and a comparatively lower intra weight factor value for an image element that is more remote from its intra prediction origin.

With reference to FIG. 14, as a typical example of factor modifier, the following modifiers can be used if the intra prediction assigns image element values column-wise from the lowest image element row in the neighboring image element group 26 positioned directly above the current group 20 in the frame 10 (intra mode 0 or vertical mode):

$$\begin{bmatrix} k_1 & k_1 & k_1 & k_1 \\ k_2 & k_2 & k_2 & k_2 \\ k_3 & k_3 & k_3 & k_3 \\ k_4 & k_4 & k_4 & k_4 \end{bmatrix}$$

In this case, $k_1$ to $k_4$ are different modifier values and $k_1 > k_2 > k_3 > k_4$. Thus, the image elements 30 in the first row are assigned comparatively higher modifier values as compared to the image elements in the lower rows as these are more distant from the image element group 26 used as intra prediction.

Correspondingly, if a horizontal mode or mode 1 is used for the intra prediction, the image elements in the last column of the group 22 positioned to the left of the current image element group 20 is used as intra prediction. In such a case, the following factor modifier could be used:

$$\begin{bmatrix} k_1 & k_2 & k_3 & k_4 \\ k_1 & k_2 & k_3 & k_4 \\ k_1 & k_2 & k_3 & k_4 \\ k_1 & k_2 & k_3 & k_4 \end{bmatrix}$$

This factor modifier assigns modifier values $k_1$ to $k_4$ that gives a comparatively higher weight to an image element 32 in the first column of the group 20 as compared to image elements 31 in more distant columns relative the neighboring image element group 22.

A further example of factor modifier is:

$$\begin{bmatrix} k_1 & k_1 & k_1 & k_1 \\ k_1 & k_2 & k_2 & k_2 \\ k_1 & k_2 & k_3 & k_3 \\ k_1 & k_2 & k_3 & k_4 \end{bmatrix}$$

which can be used for a diagonal intra prediction using image element values from both the neighbors denoted 22, 24 and 26 in FIG. 14. This mode is often denoted mode 4 or diagonal down-right in the art.

An image element group of 4×4 pixels has been assumed in the presented examples. However, the teachings can easily be extended to also relate to other group sizes.

A common characteristic of these factor modifier examples is that the different modifier values are sloping vertically, horizontally or diagonally from higher modifier values towards lower values.

The factor modifier used for the current image element block could be pre-defined. For example, a same factor modifier is used for all hybrid-encoded groups of a video sequence, a frame or a slice. Alternatively, the factor modifier to use could be defined based on the particular intra prediction type or mode of the current image element group. In such a case, each such prediction type has an associated factor modifier that will be used in the weight factor modification of step S4 in FIG. 1.

In these embodiments, an implicit selection of factor modifier is used based on the prediction type and/or frame or slice number. An explicit signaling could alternatively be used. A preferred example uses several different pre-defined factor modifies, where each such factor modifier has an assigned modifier identifier. The current image element group is then, during decoding, assigned such a modifier identifier. Generally only a few bits, such as one to three bits is required for allowing a selection between two to eight different factor modifiers, which could constitute a suitable selection set. The modifier identifier is then employed in step S4 for providing the correct factor modifier. Although less preferred, it could actually be possible to transmit the modifier values together with the image element group.

The modifier values can also or in addition be selected from various processings of the first prediction. For example, the first prediction can be filtered, e.g. using spatial difference filter, to discover any local structures, such as lines and edges, in the prediction. In such a case, image element positions coincidence with such local structures (strong edges/lines) are preferably given larger modifier values (and therefore larger weight factor values) than other image element positions coincidence with weaker structures.

In either case, the selected factor modifier is applied to the initial first weight factor to obtain a modified first weight factor comprising multiple factor values. This modification is typically implemented through a multiplication between the initial factor $w_1$ and the factor modifier although other procedures (addition or XOR) are possible. An example of such a generated first weight factor could then be:

$$\begin{bmatrix} w_1k_1 & w_1k_1 & w_1k_1 & w_1k_1 \\ w_1k_2 & w_1k_2 & w_1k_2 & w_1k_2 \\ w_1k_3 & w_1k_3 & w_1k_3 & w_1k_3 \\ w_1k_4 & w_1k_4 & w_1k_4 & w_1k_4 \end{bmatrix}$$

Thus, even though a single initial first weight value $w_1$ is assigned to the image element group, the factor modifier will generate a set of different factor modifiers $w_1k_i$, where i=1-4 in this example, which reflects the relative uncertainty or expected error in the used first image element predictions. Below is another example of first weighting factor in the case of, for instance, a line passing through the image group. In such a case, the image element positions of that line [(1, 4); (2, 3); (2, 4); (3, 2); (3, 3); (4, 1) and (4, 2)] have relatively higher factor modifiers as compared to other image element positions:

$$\begin{bmatrix} w_1k_4 & w_1k_4 & w_1k_2 & w_1k_1 \\ w_1k_4 & w_1k_2 & w_1k_1 & w_1k_1 \\ w_1k_2 & w_1k_1 & w_1k_1 & w_1k_2 \\ w_1k_1 & w_1k_1 & w_1k_2 & w_1k_3 \end{bmatrix}$$

The above discussion of providing and using a first weight factor of step S4 can also be applied to the other weighting factor provided in step S3. If this other factor is an intra weighting factor, the factor value to use is preferably selected based on the particular intra weighted mode used for the second intra prediction provided in step S2. Thus, the factor modifier should then have respective modifier values that put more weights to image element positions that are expected to be more accurate when using the intra prediction, i.e. being close to the neighboring image element group uses as second intra prediction for the current group. More distant image element positions have comparatively lower associated modifier values.

If the prediction provided in step S2 is an inter prediction and the prediction provided in step S1 is an intra prediction, the inter factor modifier preferably has a substantially opposite modifier value allocation as compared to the intra factor modifier. Thus, an image element position close to the neighboring group used as intra prediction has a low inter modifier value, while a more distant image element position has a comparatively larger inter modifier value. A typical example could then be to use an inter modifier value $l_{ij}=1-k_{ij}$. The image elements having a high uncertainty of the intra prediction therefore has low intra modifier value but a high inter prediction value, while the opposite is true for an image element having a high certainty of the intra prediction. In this context high value implies a value between 0.5 and 1 and a low value implies a value in the interval 0 to 0.5, in the case of a maximum value of 1.

A next step S5 determines a weighted first prediction for the image block by applying the first weight factor generated in step S4 to the first prediction provided in step S1. This determination preferably involves multiplying a respective first prediction value for image element $p_{ij}$ with its associated first weight factor $w_1k_{ij}$, where i, j denotes the image element position in the image element group. The final weighted first prediction would then be:

$$W_1P_1 = \begin{bmatrix} w_1k_{11}p_{11} & w_1k_{12}p_{12} & w_1k_{13}p_{13} & w_1k_{14}p_{14} \\ w_1k_{21}p_{21} & w_1k_{22}p_{22} & w_1k_{23}p_{23} & w_1k_{24}p_{24} \\ w_1k_{31}p_{31} & w_1k_{32}p_{32} & w_1k_{33}p_{33} & w_1k_{34}p_{34} \\ w_1k_{41}p_{41} & w_1k_{42}p_{42} & w_1k_{43}p_{43} & w_1k_{44}p_{44} \end{bmatrix}$$

A next step S6 determines a weighted prediction of the second prediction for the image element. This determination is performed in a similar manner as step S5, though using different input predictions and another weighting factor. The result could then be in the form of:

$$W_2P_2 = \begin{bmatrix} w_2q_{11} & w_2q_{12} & w_2q_{14} & w_2q_{14} \\ w_2q_{21} & w_2q_{22} & w_2q_{24} & w_2q_{24} \\ w_2q_{31} & w_2q_{32} & w_2q_{33} & w_2q_{34} \\ w_2q_{41} & w_2q_{42} & w_2q_{43} & w_2q_{44} \end{bmatrix}$$

or $$W_2P_2 = \begin{bmatrix} w_2l_{11}q_{11} & w_2l_{12}q_{12} & w_2l_{13}q_{13} & w_2l_{14}q_{14} \\ w_2l_{21}q_{21} & w_2l_{22}q_{22} & w_2l_{23}q_{23} & w_2l_{24}q_{24} \\ w_2l_{31}q_{31} & w_2l_{32}q_{32} & w_2l_{33}q_{33} & w_2l_{34}q_{34} \\ w_2l_{41}q_{41} & w_2l_{42}q_{42} & w_2l_{43}q_{43} & w_2l_{44}q_{44} \end{bmatrix}$$

depending on whether a factor modifier is used also for the second prediction $P_2$, where $q_{ij}$ is the image element value at image element position i, j of the second prediction.

The first and second predictions can optionally be filtered before applying the weights. For example, the first prediction can be low-pass filtered, whereas the second prediction is high-pass filtered before applying the respective first and second weighting factors. Also other forms of prediction pre-processing known in the art can be used according to the present invention.

The next step S7 generates a decoded version of the group of image elements based on the weighted first prediction determined in step S5 and the weighted second prediction determined in step S6. This calculation is preferably performed by, position-wise, adding the respective weighted image element values to obtain $w_1k_{ij}p_{ij}+w_2q_{ij}$ or $w_1k_{ij}p_{ij}+w_2l_{ij}q_{ij}$ for the different image elements. It is anticipated by the present invention that further processing of the image elements is generally taking place in the form of adding a residual and/or filtering the final results. For example, residuals can be added to the predictions after applying weights $(w_1k_{ij}p_{ij}+w_2q_{ij}+R_{ij})$. Alternatively, residuals are added to the respective predictions before applying weights $(w_1k_{ij}\times(p_{ij}+R1_{ij})+w_2\times(q_{ij}R2_{ij}))$. The method then ends.

In an alternative approach a table look-up procedure is employed for generating the decoded image group. In such a case one of the predictions is used as a basic prediction to which a table look-up value or weighted table look-up value is added. This table look-up value is then generated based on the first and second predictions, preferably based on a (image element wise) difference between the two predictions. A typical example could then be:

$$w_2q_{ij}+w_1k_{ij}\times f(p_{ij}-q_{ij})$$

where f(x) represents the result from the table look-up using x as input. In this and above presented argumentation at least one of the weights $w_1$ and $w_2$ can be equal to one, such as $w_2=1$. A further possibility is to include the weighting completely as a part of the table look-up procedure, such as:

$$q_{ij}+f_{w_1w_2}(p_{ij}-q_{ij})$$

where $f_{w_1w_2}$ indicates a table according to weight $w_1$ and $w_2$ that gives same prediction as $w_1k_{ij}p_{ij}+w_2l_{ij}q_{ij}$ or $w_1k_{ij}p_{ij}+w_2q_{ij}$. In fact with this table look-up approach, an arbitrary weighted combination of predictions can be performed for each image element such as:

$$q_{ij}+f_{w_1w_2}(p_{ij}-q_{ij})$$

where different possibly non-linear weighted combinations are defined in k tables where even each image element position ij can have specific tables.

It is anticipated by the present invention that the basic prediction does not necessarily have to be the second prediction as presented above.

This aspect of the present invention thus, uses a basic prediction selected from a first and a second prediction and then trims the basic prediction to more correctly represent the original image element group by usage of a weighted prediction obtainable from a quantity calculated from the first and second prediction. A preferred such quantity is a difference, such as image element wise difference, between the two predictions. The weighted prediction is preferably obtained from a table look-up procedure. However, this aspect of the invention is not limited thereto and other possibilities are possible and within the scope of this aspect. For example, a pre-defined function can use the quantity as input and outputs the trimming value to be added to the basic prediction.

This aspect, thus, involves a method of decoding a group of image elements in a frame of an encoded video sequence. The method involves providing a first prediction of the group of image elements and providing a second prediction of the group of image elements. One of the predictions is preferably an intra prediction while the other is preferably an inter prediction. A basic prediction is then selected from the first and second prediction, typically based on a flag associated with the encoded group. Alternatively, the first (or second) prediction in the encoded signal of the group could be pre-defined to be the basic prediction. A weighted prediction to trim the basic prediction is then provided based on a quantity calculated from the first second predictions, preferably a difference between the first and second predictions. A decoded version of the group of image elements is generated based on the weighted prediction and the basic prediction.

The decoded version is preferably generated based on an addition of the weighted prediction and the basic prediction. The trimming obtainable by the weighted prediction allows usage of different trimming prediction values for the image elements in the group, where the different prediction values reflects a relative uncertainty of prediction values in at least one of the first prediction and the second prediction, preferably the prediction selected as basic prediction. Alternatively, or in addition, the different prediction values reflect local contrast changes in at least one of the first prediction and the second prediction, preferably the prediction selected as basic prediction.

This aspect of the present invention also involves a decoder having decoder elements for fulfilling the operations of the above described decoding method.

An encoding method of the present invention preferably involves estimating a first prediction (intra prediction) of the image element group as previously described and estimating a second prediction (inter prediction) of the image element group as previously described. The selection of basic prediction is preferably performed based on respective error representations indicative of representing the image element groups with the first or second prediction. Generally, the prediction of the first and second prediction that best represents the group in terms of quality, i.e. has lowest associated error representation, is typically selected as basic representation.

The trimming prediction is obtained from a look-up table or function using the first and second predictions. Note that if the basic prediction, for instance, is an inter prediction, the second (intra) prediction must not necessarily be the intra prediction that best represents the image element group. In clear contrast, the intra prediction is preferably selected so to obtain a most suitable trimming prediction based on a difference between the inter and intra predictions.

The aspect also relates to an encoder having encoder elements for fulfilling the operations of the above described encoding method.

Figure 2:
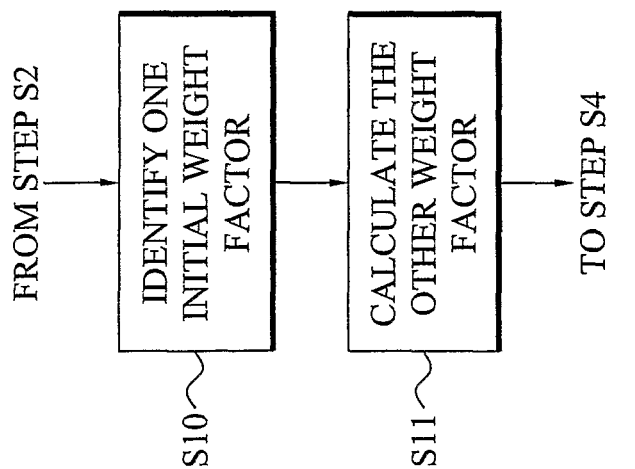
FIG. 2 is a flow diagram illustrating the first prediction providing step of the decoding method in FIG. 1 in more detail according to an embodiment of the present invention.

FIG. 2 is a flow diagram illustrating the step S3 of providing initial weight factors according to a particular embodiment of the present invention. The method continues from step S2 of FIG. 1. A next step S10 identifies one initial weight factor for the image element group. This identification can be performed by providing a weight factor that is assigned the current group, the slice or frame to which the group belongs. The weight factor can be signaled together with the encoded representation of the image element group or a weight identifier is included in this encoded representation. In the latter case, the identifier is used for a look-up procedure to identify the initial weight factor.

An implicit procedure could also be used. In such a case, a sequence, frame or slice specific weight can be used as starting point, and this weight is further processed based on other input material. The processing can for example utilize information of the initial weight factor value used for a previously decoded neighboring image element group. For example, a delta weight value can be added to the weight factor of a neighboring to get the initial weight factor. A further example is the median or average of weight factors of multiple neighboring element groups. The number of neighboring groups and which particular neighboring groups can be pre-determined based on the particular intra prediction mode used. This processing could for example use the residual information of the neighboring block to adjust the slice/frame/sequence-specific starting weight. In an alternative approach, information obtained from one or more previously decoded image element groups can be used as weight starting point. For example, the residual information of a neighboring group could constitute a suitable starting point. The residual value is the further processed to get the initial weight factor. For example, the initial weight factor can be defined as or at least proportional to the inverse of the residual. This can be performed by determining a difference in residual values between a neighboring group, preferably a neighboring group employed as reference intra prediction, and the current group. The difference can then be used in a table-look up procedure. Alternatively, the initial weight factor is implicitly defined as, on image element basis, the inverse of a residual of a corresponding image element position in a neighboring image element group or the inverse of an average residual of multiple corresponding image element positions in multiple neighboring image element groups.

A next step S11 calculates the other initial weight factor from the first weight identified in step S10. This calculation preferably involves subtracting the first initial weight $w_1$ from a predefined number, such as $w_2=(1<<\text{Shift})-w_1$, where the operation $<<$ involves left-shift x with y when $x<<y$ and Shift is a shifting factor. In this case, the first initial weight $w_1$ can be associated a weight index defined as: Index=(MaxVal−$w_1$)>>Step, where the operation $>>$ involves right-shifting x with y when $x>>y$, MaxVal is a maximum factor value for $w_1$ and Step is a step factor that is used for defining the different possible weight values of $w_1$ in steps from MinVal (minimum factor value for $w_1$) to MaxVal. Typical, but non-limiting, examples of these parameter include Shift=6, MaxVal=63, MinVal=33 and Step=2. The method then continues to step S4 of FIG. 1.

In an alternative embodiment, the step S11 is omitted. Therefore, both the first and second initial weight factors are identified in the step S10.

Figure 3:
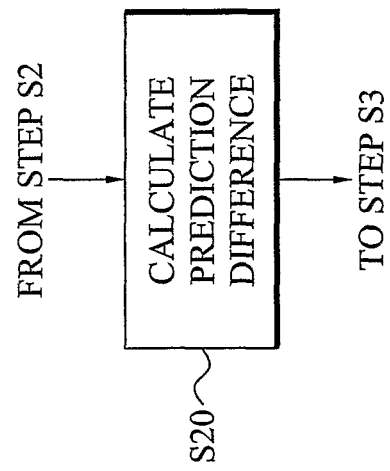
FIG. 3 is a flow diagram illustrating the second prediction providing step of the decoding method in FIG. 1 in more detail according to an embodiment of the present invention.

FIG. 3 is a flow diagram illustrating an additional step of the decoding method of FIG. 1. The method continues from step S2 of FIG. 1. A next step S20 calculates a difference, such as image element wise difference, between the provided first and second predictions used in the hybrid decoding. The difference can also be obtained by applying a spatial difference filter in each prediction. Each difference value is used as an input in a look-up table containing multiple different weight values or weigh value pairs. In such a case, each such weight or weight pair is associated with a pre-defined difference value or difference value interval. The correct initial weight to use is then the weight factor or pair that has associated value closest to the difference value or having associated interval encompassing the difference value.

If the look-up table only comprises one weight per table entry, the other weight can be calculated therefrom as described above in connection with step S11 of FIG. 2. The method then continues to step S3 of FIG. 1.

Instead of getting the initial weight from a table look-up, the actual weighted combination could be defined as the sum of one of the predictions and a table lookup of the difference between the provided first and second predictions.

FIG. 4 is flow diagram of a method of encoding a group of image elements in a frame of a video sequence. The method starts in step S30, where a first (preferably inter) prediction is estimated for the image element group to be encoded. In the case of an intra prediction, this step S30 basically involves searching through the different available intra encoding modes and, for each such mode, calculating an error value indicative of representing the image element group with the particular intra prediction mode. This is performed according to techniques well known in the art. For example, the standard rate distortion (RD) value can be used as a suitable error representation. This RD value is defines as:

$$RD=SAD+\lambda \times B,$$

where SAD is the prediction error, usually the sum of absolute difference, B is the coding cost (in bits) for coding the residual and coding the prediction modes and $\lambda$ is a scaling factor to promote one of SAD or B.

The intra encoding mode resulting in the lowest error value is typically selected and the (neighbor) image element group(s) used as group representation will be used as intra prediction for the current image element group. The step S30 also involves generating an identifier of the selected intra prediction. This identifier is typically an identifier of the selected intra prediction mode as such an identifier allows identification of the relevant intra prediction.

In the case the first prediction is an inter prediction of the image element group, the best matching image element group is searched for from a reference frame in a predetermined search window according well known error criterion. The image element group within the predetermined search window that results in a smallest error value is then selected as inter prediction in step S30. The step S30 also involves providing an identifier of the selected inter prediction. The identifier typically comprises a reference frame identifier that identifies the reference frame in which the matched image element group used as inter prediction of the current group can be found. The identifier also comprises a motion vector that defines the relative shifts in the horizontal and vertical directions of the reference group with respect to the current block in the two frames.

A next step S31 estimates a second prediction for the group. In a first embodiment, this other prediction is an intra prediction and in a second embodiment it is an inter prediction. The principles outlined above for estimating intra and inter predictions are also applicable to this step S31. As for step S30, step S31 preferably also involves providing an identifier of the second prediction, such as an inter mode identifier or a frame identifier plus a motion vector.

The actual order of conducting the two prediction estimation steps S30 and S31 can differ in available embodiments, in particular depending on what type of predictions that are estimated in the particular steps S30 and S31. A first embodiment performs the two steps sequentially in the order as illustrated in FIG. 4 with first estimation of intra prediction and then inter prediction or second intra prediction. A second sequential embodiment can use an opposite execution order in the case step S31 involves estimating an inter prediction. Thus, in such a case an inter prediction is first estimated followed by an intra or inter prediction estimation. In a third embodiment the two estimation steps S30 and S31 are performed in parallel, possibly in a combined prediction procedure.

It is anticipated by the present invention that additional (intra or inter) prediction estimations will be conducted if the hybrid encoding of the present invention involves more than two group predictions. In such a case, the selected intra predictions are preferably associated with different intra prediction modes, i.e. they are different intra predictions. Correspondingly, the different inter predictions are preferably different reference groups in a same or different reference frames within the search window.

The two predictions can optionally be processed, such as filtered before any weighting factors are determined as was previously described.

A next step S32 selects initial first weight to use for the first prediction estimated in step S30. This step S32 can be performed by searching through the available weight factors, if a limited set of pre-defined factors is available. Another approach could be to use the initial first weight factor assigned to a previously encoded neighboring group as starting point and then performing a search within a defined search window from that starting point to get a good weight candidate. The starting point does not necessarily have to be the initial first weight factor of a neighboring group but could instead be a pre-defined starting weight that is assigned to the current video sequence, frame or slice or be based on the residual data of a neighboring group.

A next step S33 defines a factor modifier to be applied to the defined first weighting factor to generate a first weighting factor that comprises multiple factor values. These different factor values are, as previously described, associated with different image element positions in the image element group. The factor modifier is also selected to get factor values that reflect the relative uncertainty in the estimated predictions, in particular in an intra prediction. If the first prediction was an intra prediction, the factor modifier to use is preferably, at least partly, selected based on the particular intra prediction mode used for the selected intra prediction of step S30.

Alternatively, or in addition, the factor modifier can be determined at least partly by processing of the first prediction to reflect different structural features and objects in the prediction. In such a case, prominent objects having a clear contrast in relation to a more vague background should be weighted higher. The image element positions of the factor modifier that corresponds to such prominent objects then have factor modifier values that give rise to larger weighting factors as compared to other image element positions in the group.

The step S34 then defines a second weighting factor that is to be applied, during decoding, to the prediction estimated in step S31. Thus, this weighting factor is an intra weighting factor or an inter weighting factor. The procedure described above in connection with step S32 can also be used when selecting second weighting factor of step S34. Alternatively, the weighting factors defined in step S32 and S34 have a mutual pre-defined relation, for example the sum thereof is equal to a constant or the quotient thereof is equal to a constant. In such a case, the defining step S34 merely involves calculating the second weighting factor from the initial first weighting factor and the constant. This step S34 is furthermore repeated for each additional prediction in the case of more than two predictions per group in the hybrid encoding.

As has been described in the foregoing, a factor modifier can also be applied to the second weighting factor defined in step S34, in particular if that second weighting factor is a second intra weighting factor. In such a case, an additional factor modifier defining step is preferably conducted in connection with step S34.

The image element block CIIP can then be represented by these weighting factors, factor modifier and predictions plus a residual R that is calculated as the difference between the weighted predictions and the current image block according to techniques well known in the art and presented as:

$$CIIP_{ij}=p_{ij}w_1k_{ij}+q_{ij}w_2+R_{ij}$$

or $$CIIP_{ij}=p_{ij}w_1k_{ij}+q_{ij}w_2l_{ij}+R_{ij}$$

The residual can instead be added before weighting to get one of the following cases:

$$CIIP_{ij}=(p_{ij}+R_{ij}^1)w_1k_{ij}+(q_{ij}+R_{ij}^2)w_2$$

or $$CIIP_{ij}=(p_{ij}+R_{ij}^1)w_1k_{ij}+q_{ij}w_2+R_{ij}^2$$

or $$CIIP_{ij}=p_{ij}w_1k_{ij}+(q_{ij}+R_{ij}^2)w_2+R_{ij}^1$$

The actual choice between weighting before and after residual addition is preferably based on which particular choice that gives the best quality.

The finally encoded group estimation comprises the identifier of the first prediction, the identifier of the second prediction, the residual and an identifier of at least one of the initial first weighting factor and the second weighting factor. It is anticipated by the present invention that the weighting factor identifier does not necessarily have to be an explicit identifier. In an implicit approach, the difference or quotient between the estimated predictions, or the spatial difference for respective predictions can be used as weighting factor identifier. Alternatively, the residual values of the current block and neighboring blocks can be used as weighting factor identifier. The weight identifier could then point to a table comprising multiple defined weighting factors.

The method then ends.

It is anticipated by the present invention that not all image elements groups of a video sequence must necessarily be encoded by the hybrid encoding of the present invention. In clear contrast other groups in the same or different frames can be encoded according to the prior art inter (P or B type) coding or intra coding.

FIG. 5 illustrates an embodiment of performing the prediction estimating steps S30 and S31 of FIG. 4. The method starts in step S40 where a suitable block partition is selected for a macroblock (16×16 pixels) to be encoded. Any of the prior art available block sizes, including 16×16, 16×8, 8×16, 8×8, 8×4, 4×8 and 4×4 pixels, could be used. The best inter prediction for the different respective available group sizes is identified in step S41. In practice the two steps S40 and S41 are typically performed in parallel. The steps preferably searches through all available block partitions and available reference blocks in frames within the allowed search window. The partition and reference block resulting in smallest error value is typically selected. Other procedures known in the art for finding inter block prediction can be used.

Once the best inter prediction and partition has been selected a suitable intra prediction is identified in step S42. This can also performed through an exhaustive search among the available intra prediction modes. In a preferred implementation, this search is performed at least partly based on the selected inter block prediction and in particular the block partition of that prediction. The reason for this is that different intra modes can be available for different block partitions. For example, traditionally nine different intra modes are available for a 4×4 block size, while four corresponding modes are available for the 16×16 size. Another reason for this is that the motion vectors of the inter prediction should try to follow the true motion field. This might not be the case if the intra prediction is performed first and the inter prediction search is done based on the intra prediction.

The search of step S42 can also be performed at least partly based on an error value associated with representing the current block with the determined inter prediction. Thus, the value of this error can be used for selecting a suitable intra prediction/mode to also use for the block.

In either case, once the best (in terms of minimizing the error in representing the block with the predictions) the previously described prediction identifiers are provided in step S43. The method then continues to step S32 of FIG. 6.

Thus, a first embodiment of the invention first selects block predictions, typically starting with an inter prediction. Thereafter suitable weighting factors and factor modifier are selection. Another approach utilizes a combined encoding, where both predictions and weights are selected together. For example, a "best" inter prediction is first determined. Thereafter, for each available intra mode (as determined based on the determined inter prediction), different available weighting factors and factor modifiers are tested. The best weighting factor and factor modifier set per available intra mode is notified together with the error associated with representing the block with that combination of predictions and factors. Thereafter the intra prediction+weight combination with lowest associated error is selected. Alternatively, a traditional inter encoding of the block is first conducted, including calculating an inter residual value. Thereafter, intra prediction and weighting factors are calculated, followed by the calculation of a "global" residual for the block.

In video coding there are often several inter macroblock types corresponding to different partitioning of the macroblock. There can also be several intra macroblock types corresponding to specific intra directional predictions for different partitions of the macroblock. The present invention proposes, new macroblock types that describe both which inter prediction type and which intra prediction type that are used for a weighted combination.

As an example, the new approach can be introduced as new macroblock types in addition to inter only and intra only macroblock types. According to one embodiment of the invention, a variable length coding approach of the new macroblock types is to assign larger coding index for them than the codes for the intra only and inter only macroblock types. In this way, the approach will theoretically not reduce the performance of a video coder with intra only and inter only macroblock types using rate-distortion optimization since it will only be selected if it is more efficient than present macroblock types.

An example of a macroblock types assignment using combined intra and inter prediction as an extension of H.264 is given below. Lowest coding index are given to inter prediction 16×16 and intra prediction 4×4. Thereafter, inter prediction 16×16 and intra prediction 16×16 come. The intra 16×16 mode is also part of the macroblock type. Then, inter 16×8 and the intra types come and so on until 8×8ref and the intra types. There are typically 31 old macroblock types. It should be noted that no CBP (Coded Block Pattern) values are included in the coding of the intra 16×16 prediction part.

An example of coding index assignment of the new macroblock types can be described by:

$$Index=31+5\times MbTypeInter+MbTypeIntra+Intra16\times 16Mode$$

where MbTypeInter ranges from 0 to 4 including inter 16×16, 16×8, 8×16, 8×8ref0 and 8×8, MbTypeIntra ranges from 0 to 1 including intra 4×4 and 16×16 respectively, and if MbTypeIntra is equal to 1, Intra16×16Mode preferably ranges from 0 to 3 otherwise it is preferably 0.

According to an embodiment of the invention, macroblock types using weighted combinations are coded with a higher coding index than the other macroblock types.

An example of coding macroblock parameters as an extension to H.264 is given below. The macroblock type and the macroblock weight are coded as described above. Motion vectors, reference frames, sub macroblock types, intra 4×4 prediction modes and intra chroma prediction modes are coded as in H.264. It should be noted that in the prediction of the intra 4×4 mode, MbTypeIntra of adjacent macroblocks are preferably checked instead of MbType to also allow correct prediction of intra 4×4 modes for the new approach. This modification is also done for the intra 4×4 only macroblock type. The coded block patterns CBP are coded using the intra only CBP table. Finally are DQuant and residual coefficients coded as in a H.264.

Thus, the tools of the Joint Video Team (JVT) standard can used in the extension disclosed by the present invention.

Rate-distortion optimization is an important tool for achieving good compression efficiency in current video coding standards.

An example of optimization using the new approach is given below. First, a rate-distortion search of best inter coding and best intra coding macroblock is performed as described above. Then the best inter prediction mode is used as a starting point for a refined search of best intra prediction and best weights. In order to make the inter prediction match the intra prediction even better, either the combined prediction can be lowpass filtered or the inter prediction lowpass filtered before combination. The latter can be achieved by doing a refined inter search simultaneous or after the intra refinement search. The refined inter search can for example include a half and quarter per search.

To reduce encoder complexity the weights can be determined using linear regression using for example the best intra only prediction and the best inter only prediction. A refined weight search can be used to improve the rate-distortion performance.

The present invention provides better coding efficiency than the newest video coding standard H.264. The invention is especially good when it is hard to find a good inter prediction such as in sports video sequences. However, the invention works for other sequences as well.

Furthermore, the invention can potentially be used to provide SNR scalability. A base layer can use intra and inter prediction coding as H.264 to provide a base coding rate. An enhancement layer can then add intra coding modes and weights to make a weighted intra and inter prediction to provide an enhanced coding rate.

The invention can also potentially be used to perform a pre-deblocking filtering of the inter prediction, which improves the transform coding. This is in contrast to traditionally deblocking filtering that is performed on the reconstructed image.

The invention can also potentially be used to achieve better coding efficiency in combination with error resilience. This can be achieved by combining the standard intra refresh with a weighted part of previous decoded frame.

In the following, an example of using the present invention on top of H.264 is compared with H.264 (similar as JSVM_5_11 using single layer coding) and for a low delay configuration IPPP using one reference frame. The results are generated for fixed quantization parameters and using VLC. Bitrates and sequences are according to SNR scalability test configurations in JVT-Q205 [3].

TABLE 1

| Football | Foreman | Bus | Mobile | Average |
|---|---|---|---|---|
| 1.74% | 1.18% | 0.69% | 0.79% | 1.10% |

Table 1 illustrates Bjontegaard bit-rate savings for QCIF (Quarter Common Intermediate Format) 15 Hz with constrained intra prediction turned off.

TABLE 2

| Football | Foreman | Bus | Mobile | Average |
|---|---|---|---|---|
| 2.00% | 1.46% | 0.36% | 0.94% | 1.19% |

Table 2 lists Bjontegaard bit-rate savings for CIF 30 Hz with constrained intra prediction turned off.

Figure 6:
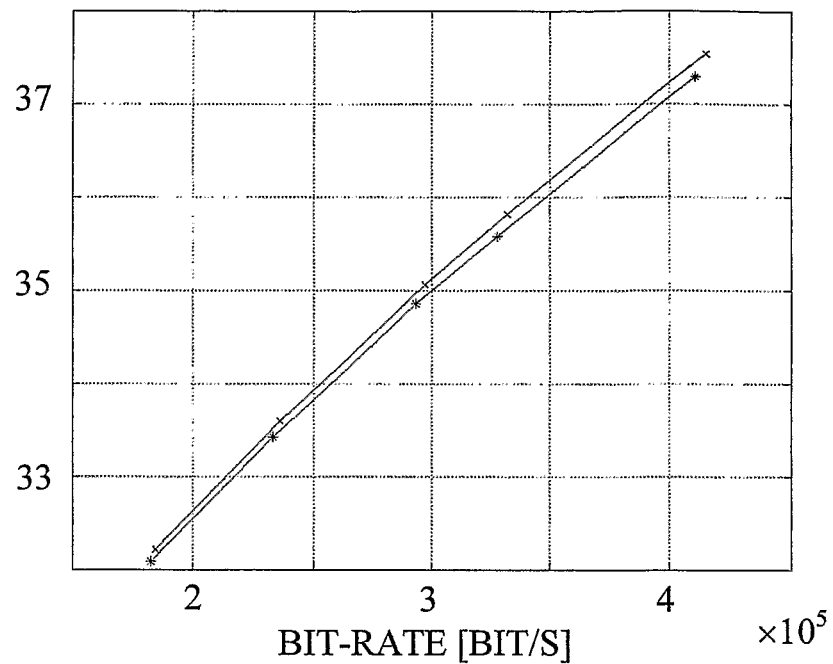
FIG. 6 is a diagram illustrating an RD-curve for Football at QCIF 15 Hz without constrained intra prediction according to prior art ("*") and according to the present invention ("x")
Figure 7:
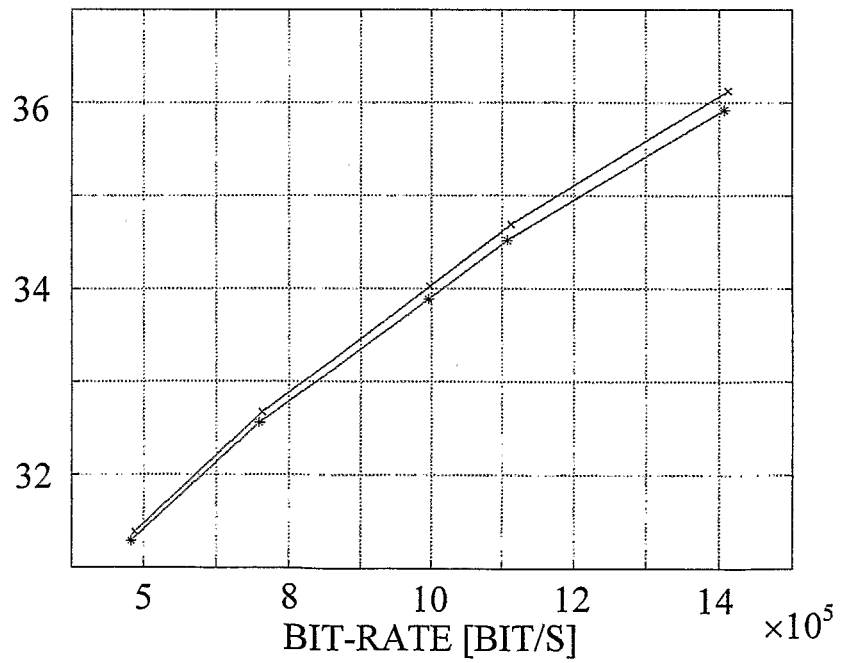
FIG. 7 is a diagram illustrating an RD-curve for Football at CIF 30 Hz without constrained intra prediction according to prior art ("*") and according to the present invention ("x")

FIG. 6 illustrates RD curve for Football at QCIF 15 Hz without constrained intra prediction and FIG. 7 illustrates RD-curve for Football at CIF 30 Hz without constrained intra prediction. In these diagrams, the results achieved according to the present invention are marked with 'x', while prior art results are marked with '*'.

The complexity of the decoder using the new approach on top of H.264 compared to a H.264 standard decoding has also been evaluated, see Table 3 below. The results have been achieved as an average over 100 runs per sequence and quantization parameter on an Intel Pentium Mobile 2.00 GHz. In order to reduce influence of hard disc performance, decoded results are not written to file and no screen prints are used. Furthermore no other programs are run during the test.

TABLE 3

| Football | Foreman | Bus | Mobile | Average |
|---|---|---|---|---|
| 7.04% | 1.56% | 2.43% | 1.49% | 3.13% |

Table 3 illustrates CIIP decoder complexity increase for QCIF 15 HZ with constrained intra prediction turned off.

If 8×8 intra prediction is allowed as when for example Fidelity Range Extension (FRExt, Amendment to AVC/H.264) is used and a transform size 8×8 flag is set to 1 then MbTypeIntra=0 (see above) can correspond to an intra 8×8 prediction. In this case the hybrid encoding of the invention is used in combination with intra 8×8 prediction and the residual can be coded by the 8×8 transform.

Correspondingly, if 8×8 transform is allowed as when for example Fidelity Range Extension (FRExt, Amendment to AVC/H.264) is used and a transform size 8×8 flag is set to 1 then MbTypeIntra>0 (see above) can correspond to an intra 16×16 prediction. In this case the hybrid encoding of the invention is used in combination with intra 16×16 prediction and the residual can be coded by the 8×8 transform.

The present invention can be applied for scalable video coding for example in JSVM [4], the teachings of which is hereby incorporated by reference. In scalable video coding inter-layer prediction of coding parameters is important for high coding efficiency. For a hybrid macroblock such parameters can include motion parameters, intra prediction modes, weights, and residual. If a macroblock has a hybrid macroblock type corresponding intra and inter prediction modes and the corresponding weighted prediction can be determined as described above. If FRExt is used the section above on 8×8 intra prediction and 8×8 transform can apply.

Figure 8:
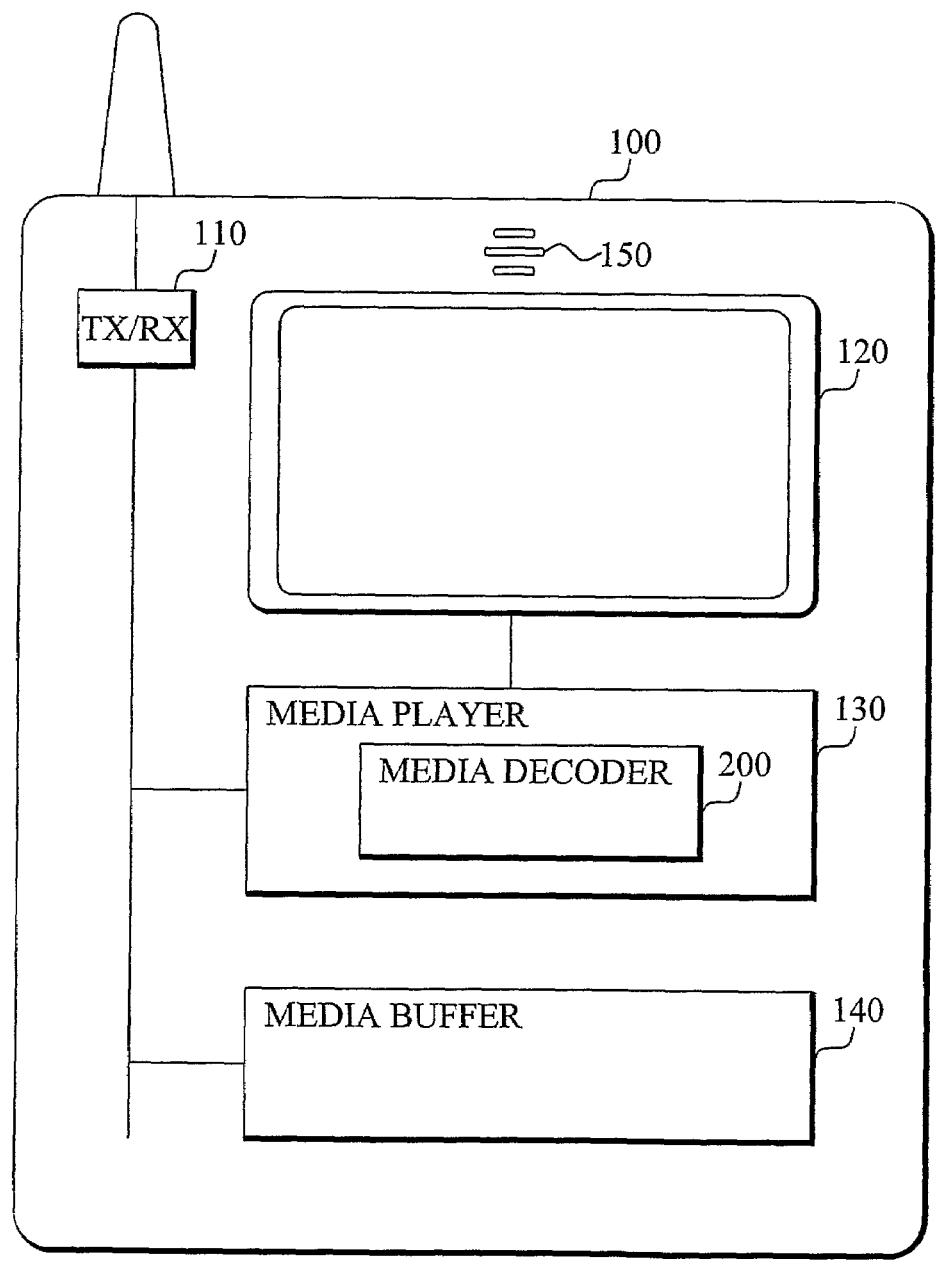
FIG. 8 is a schematic block diagram of a user terminal equipped with a media decoder according to the present invention.

FIG. 8 is a schematic illustration of an example of a user terminal 100 implementing the teachings of the present invention. This user terminal 100 is in the form of a mobile terminal or telephone 100 adapted for conducting wireless communication. The present invention is, however, not limited to such handheld media processing terminals but can actually be applied to any media processing and presenting terminal.

This user terminal 100 comprises a transmitter and receiver or transceiver 110, schematically illustrated as a single unit in the figure. The unit 110 includes traditional transmitter/receiver functionality, such as modulator/demodulator, etc. The receiver part of the unit 110 is in particular adapted for receiving a video sequence according to the present invention.

The terminal 100 also comprises a media buffer 140 for temporarily storing video data of the sequence received by the receiver 110. This buffer 140 is mainly employed for combating jitter occurring when transmitting the media over a network.

A media player 130 is arranged for decoding and rendering video data fetched from the media buffer 140. The rendered media is displayed on a connected display screen 120 and possibly associated audio data can be played on a loudspeaker 150.

The media player 130 in particular comprises or is connected to a media decoder 200 according to the present invention.

Although not illustrated in the figure, the user terminal 100 can also comprise an encoder according to the present invention in addition to the decoder 200. Alternatively, the terminal 100 does not contain a decoder 200 but only an encoder of the invention.

The units 110, 130 and 200 of the user terminal 100 may be provided as software, hardware or a combination thereof.

Figure 9:
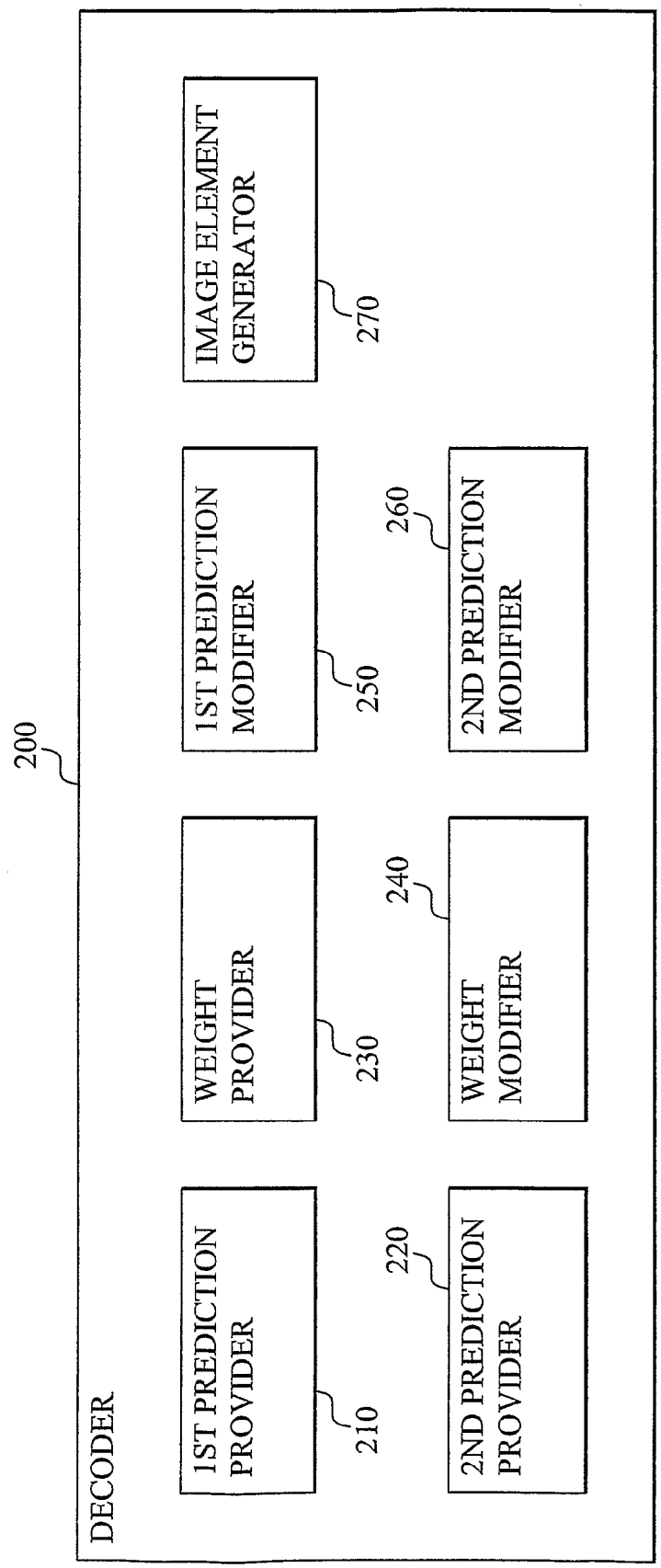
FIG. 9 is a schematic block diagram of a decoder according to the present invention.

FIG. 9 is a schematic block diagram illustrating a decoder embodiment 200 according to the present invention that can be implemented in the user terminal of FIG. 8. The decoder 200 receives encoded image element data, where each image element group is represented by an encoded group representation. The encoded video sequence therefore comprises, among others, multiple such encoded group representations that are decoded by the decoder 200.

The decoder 200 comprises a first prediction provider 210 arranged for providing a first prediction of a group of image elements in a frame of an encoded video sequence. The prediction provider 210 preferably uses first prediction identifiers, such as an intra mode identifier or frame identifier plus motion vector, in identifying and providing the first prediction. The provided prediction is preferably based on at least one previously decoded version of an encoded image element group in the same frame as the current group or in another frame of the encoded video sequence. In the former case, the at least one encoded image element group is furthermore preferably one or more neighboring groups in the frame.

A second prediction provider 220 is arranged in the decoder 200 for providing at least one second image group prediction for the image element group. The provider 220 preferably uses a prediction identifier in identifying and providing the correct second prediction, preferably an intra mode identifier or a reference frame identifier plus a motion vector.

The decoder 200 also comprises a weight provider 230 arranged for providing an initial first weighting factor and at least one second weighting factor. The initial weighting factor is, after modification, to be applied by a first prediction modifier 250 to the first prediction applied by the first prediction provider 210. Correspondingly, the at least one additional second factor is to be applied, possible after additional modification, by a second prediction modifier 260 to the at least one second prediction provided by the second prediction provider 220.

The weight provider 230 can operate according to different embodiments of the invention when providing the weighting factors. In a first embodiment, the encoded group representation comprises the weighting factors. In such a case, the weight provider 230 simply retrieves the weight factor data from the encoded group representation. Alternatively, the encoded group representation comprises an explicit identifier to a weight factor database or table (not illustrated), allowing the weight provider 230 to retrieve the correct weights from the connected table. Also implicit identifiers can be used, such as an identifier obtainable if the weight provider 230 calculates a difference or quotient between the group predictions from the first 210 and second 220 prediction providers or based on residual data from the encoded group representation and preferably also such residual data from previously decoded group representations.

The weight provider 230 can also calculate one of the weighting factors based on the other factor. In such a case, the table-look procedure or the retrieval from the encoded group merely provides a subset of the required weighting factors. The weight provider 230 can then use any of the previously described calculation operations for obtaining the remaining weighting factor(s).

A weight modifier 240 is arranged connected to the weight provider 230 and operates for modifying at least the initial first weighting factor from the provider with a factor modifier retrieved or calculated by the weight modifier 240. The modification, such as multiplication, addition, exclusive OR (XOR) or some other operation, generates a first weighting factor that comprises multiple factor values, where each such factor value is associated with at least one image element position in the image element group. The factor modifier is also selected so that the different factor values reflect the relative uncertainties of the first predictions at the different image element positions in the group and/or structural characteristics or features at different image elements positions.

The provision of the factor modifier can be performed by the weight modifier 240 by retrieving the modifier from the encoded representation, fetching the modifier from a connected look-up table (not illustrated) using an explicit modifier identifier of the encoded representation or providing the modifier using an implicit identifier. A typical example of the latter is the usage of intra mode specific factor modifiers having modifier values and distribution dependent on the actual intra mode used for the intra prediction generated by the prediction provider 210.

The weight modifier 240 may also provide factor modifier and modify the other weighting factor(s) provided by the weight provider 230 in a similar way.

The first prediction modifier 250 uses the first weighting factor generated by the weight modifier 240 for weighting the first prediction provided by the first prediction provider 210 as previously described. Correspondingly, the second prediction modifier 260 uses the second weighting factor from the weight provider 230 (or modified second weighting factor from the modifier 240) for generating a modified second prediction of the image element group.

The two modified predictions from these units 250, 260 are forwarded to an image element generator 270 that is arranged in the decoder 200 for generating image element values, such as color values or luminance and chrominance values, to the image elements in the group based on the modified prediction. The generator 270 typically adds the two modified prediction and preferably also adds any residual or rounding data to obtain the different values. Residuals can be added before applying weighting factors as previously described.

The units 210 to 270 of the decoder 200 may be provided as software, hardware or a combination thereof. A distributed implementation is also possible where at least one of the units 210 to 270 could be provided elsewhere in a user terminal, in which the decoder is implemented.

Figure 10:
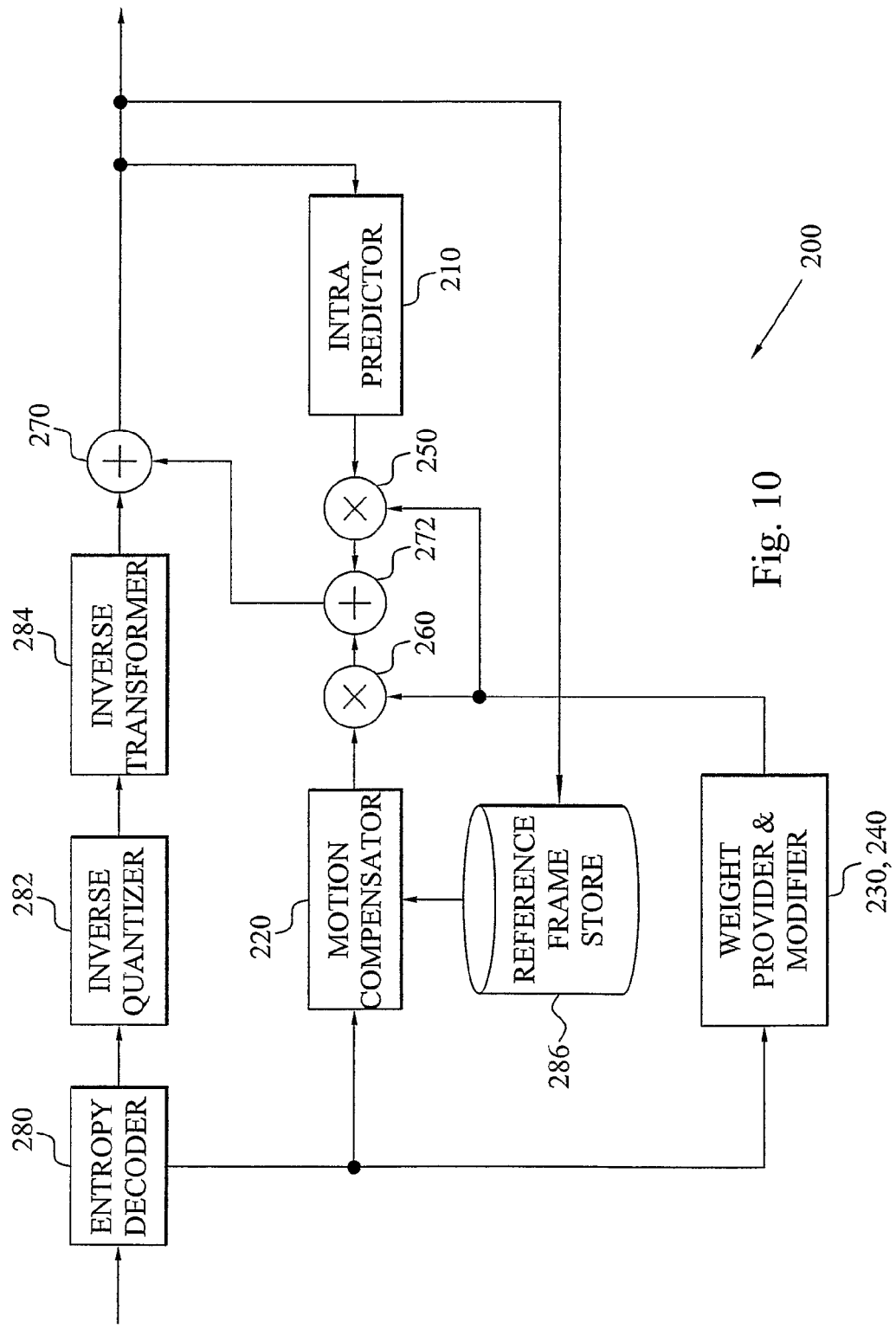
FIG. 10 is a schematic block diagram of another decoder according to the present invention.

FIG. 10 illustrates another embodiment of a decoder 200 according to the present invention. The decoder 200 includes an entropy decoder 280 for receiving an input bit-stream (encoded group representations). The entropy decoder 280 is coupled for providing the decoded output to an inverse quantizer 282 and thereafter to an inverse transformer 284. The output of the inverse transformer 284 is connected to a summer 270 (corresponds to image element generator of FIG. 9) in turn coupled to an intra predictor 210. The intra predictor is coupled to a first prediction modifier 250, schematically represented by a multiplier in the figure. The output of the summer 270 is also coupled, possibly via a deblocking filer (not illustrated) for providing output images to a reference frame store 286. The frame store 286 is coupled to a motion compensator 220 that operates as an inter predictor. The motion compensator 220 is also connected to a second prediction modifier 260. The entropy decoder 280 is also connected for providing motion vectors to a second input of the motion compensator 220. The decoder 280 also provides input data to a weight provider and modifier 230, 240 that uses the input data (weight identifiers or other data representative of the weights) for providing initial intra weighting factors, factor modifiers and inter weighting factors. The unit 230, 240 also outputs the correct intra and inter weighting factors to the prediction modifiers 250, 260. The outputs of these prediction modifiers 250, 260 are connected to a summer 272, which has its output in connection with the summer 270. The operation of this decoder embodiment 200 is similar to the embodiment described above and disclosed in FIG. 9.

Figure 11:
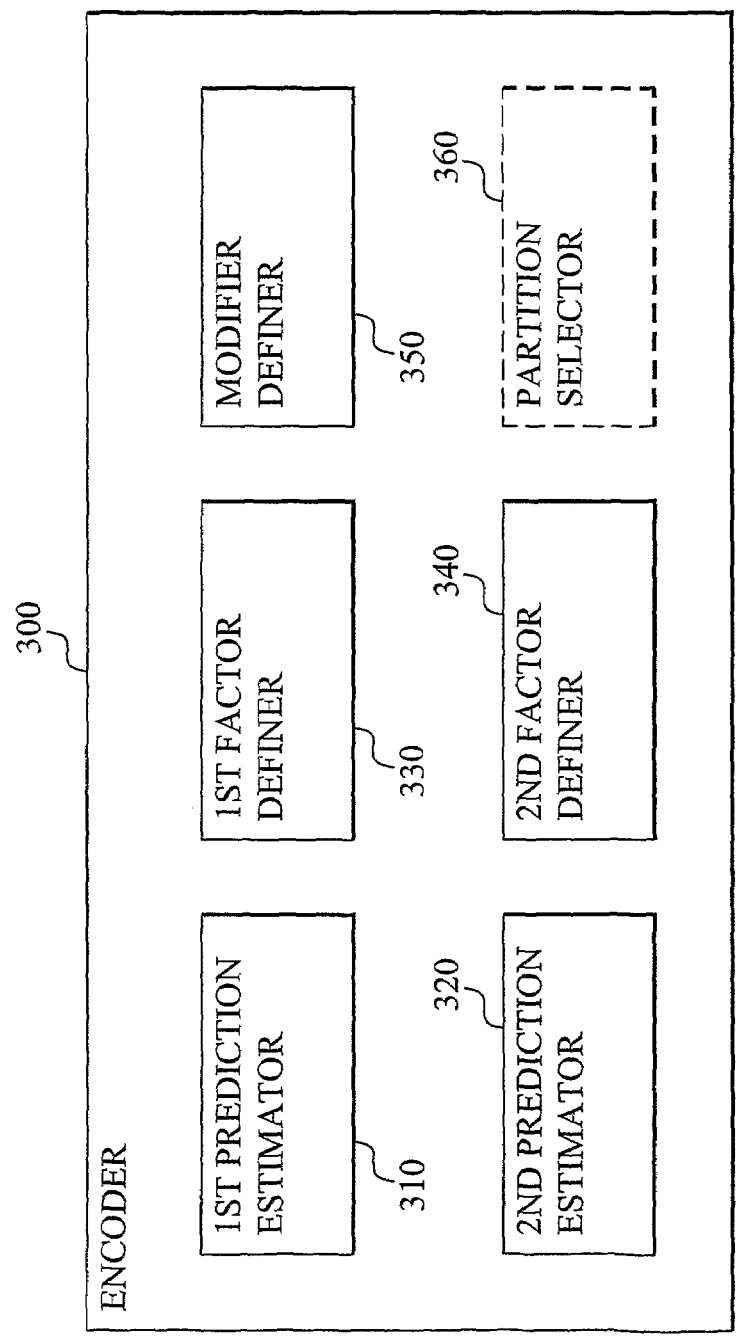
FIG. 11 is a schematic block diagram of an encoder according to the present invention.

FIG. 11 is a schematic block diagram of a video sequence encoder 300 according to the present invention. The encoder 300 receiving an input video sequence comprising frames having multiple image element groups.

The input data is processed by a first prediction estimator 310 that is arranged for estimating a first prediction of an image element group to be encoded. The operation of the estimator 310 is as previously described for and involve providing a first prediction identifier. A second prediction estimator 320 is also arranged in the encoder 300 for generating a second prediction of the image element group as previously described. The estimator 320 also provides second prediction identifiers. The estimators 310, 320 not only selects the relevant reference image element groups to use as predictions but also preferably determines the best group size for the current image element group, i.e. whether the group should be handled as a macroblock or be a sub-block or partition. Alternatively, this size selection can be performed by a dedicated partition selector 360 of the encoder 300.

A first factor definer 330 is arranged for defining an initial first weighting factor for the image element group. Correspondingly, a second factor definer 340 is implemented to define a second weighting factor to be applied to the second group prediction. These determinations are performed as previously described. A modifier definer 350 is arranged for defining a factor modifier to be applied to the initial first weighting factor from the first definer 330 to generate a first weighting factor comprising multiple factor values associated with different image element positions within the group. Unless using implicit weighting factor and modifier identifiers the different definers 330, 340, 350 also provides respective identifiers allowing a decoder to provide the correct weighting factors and factor modifier.

The encoder 300 preferably also comprises a residual encoder for generating residual error representative of the difference between the original image element group and the group as represented by the first prediction modified by the first weighting factor and the other prediction modified by the other weighting factor. The encoded group representation preferably then comprises the first prediction identifier, the second prediction identifier and at least one the initial first weighting factor identifier and the second weighting factor identifier. This at least one factor identifier can be in the form of an explicit (specific bit-sequence in the encoded representation) or implicit (calculable from other sequences in the encoded representation). The encoded representation may also comprise residual data, and other weighting factor and/or modifier identifiers.

The units 310 to 360 of the encoder 300 may be provided as software, hardware or a combination thereof.

Figure 12:
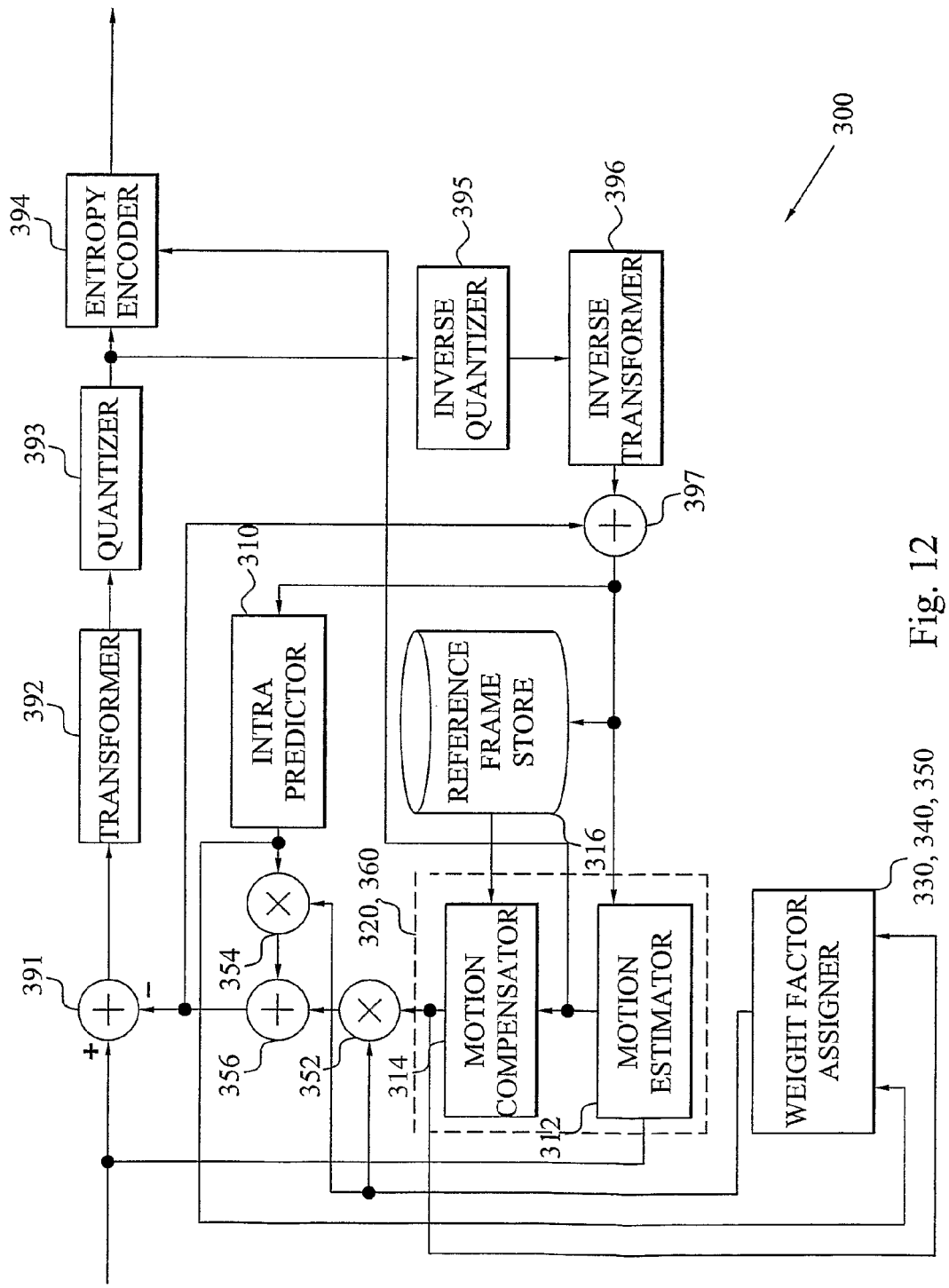
FIG. 12 is a schematic block diagram of another encoder according to the present invention.

FIG. 12 depicts an exemplary encoder 300 according to another embodiment of the present invention. The encoder includes a video input terminal that is coupled in signal communication to a positive input of a summer 391. The summer 391 is coupled to a transformer 392 followed by a quantizer 393. The output of the quantizer is connected to the input of an entropy encoder 394 to provide an output bitstream. The output of the quantizer 393 is also connected to an in-loop portion comprising an inverse quantizer 395 followed by an inverse transformer 396. The output of the inverse transformer 397 is coupled to a summer 397, which in turn is coupled to an intra predictor 310. The output of the intra predictor 310 is coupled to a prediction modifier 354, exemplified by a multiplier in the figure. The output of the modifier 354 is coupled to a first input of a summer 356.

The output of the summer 397 is coupled, possible through a deblocking filter (not illustrated) to a reference frame store 316. The frame store 316 is coupled to a motion compensator 314, which is coupled to an input of a prediction modifier 352. The outputs of the two prediction modifiers 352, 354 are coupled to a summer 356 having its output connected to a negative input of the summer 391 and an input of the summer 397.

The video input is also connected to a first input of a motion estimator 312 to provide motion vectors. The output of the summer 397 is also connected to the motion estimator 312. The motion estimator 314 and compensator 314 collective constitute the second prediction estimator 320 and partition selector 360 of FIG. 11. The output of the motion estimator 312 is connected to the motion compensator 314 and a second input of the entropy encoder 394.

The outputs of the intra predictor 310 and the motion compensator 314 are connected to the inputs of weight factor assigner 330, 340, 350. This assigner uses the inter and intra predictions for selecting initial intra weighting factor, factor modifier and inter weighting factor. These outputs are forwarded to the prediction modifiers 352, 354 that modifies the intra and inter predictions.

It will be understood by a person skilled in the art that various modifications and changes may be made to the present invention without departure from the scope thereof, which is defined by the appended claims.

REFERENCES

[1] ITU-T Rec. H.264 and ISO/IEC 14496-10, "Advanced Video Coding", 2003
[2] WO 2004/064255
[3] JVT-Q205 "Testing Conditions for SVC Coding Efficiency and JSVM Performance Evaluation", Poznan, 23-29 Jul., 2005
[4] Joint Draft 7 of SVC Amendment, Joint Video Team (JVT) of ISO/IEC MPEG & ITU-T VCEG, 2006

The invention claimed is:

1. A method of decoding a group of image elements in a frame of an encoded video sequence, said method comprising the steps of:
   a) providing a first prediction of said group of image elements, wherein said providing comprises providing an intra prediction of said group of image elements based on a decoded version of an encoded group of image elements in said frame;
   b) providing a second prediction of said group of image elements;
   c) providing an initial first weighting factor;
   d) generating a first weighting factor comprising multiple factor values by modifying said initial first weighting factor with a factor modifier, each factor value being associated with an image element position in said group of image elements and said factor values being dependent on their associated relative image element position in said group of image elements, wherein said factor modifier is selected to have multiple factor values dependent on a relative image element position in said group of image elements, where a first factor value associated with a first image element position in said group of image elements is larger than a second factor value associated with a second image element position in said group of image elements, said second image element position being further from said encoded group of image elements in said frame than said first image element position;
   e) providing a second weighting factor;
   f) determining a weighted first prediction based on said first prediction and said first weighting factor;
   g) determining a second weighted prediction based on said second prediction and said second weighting factor;
   h) generating a decoded version of said group of image elements based on said weighted first prediction and said second weighted prediction.

2. The method according to claim 1, wherein said providing step b) comprises providing an inter prediction of said group of image elements based on a decoded version of an encoded group of image elements in another frame of said encoded video sequence.

3. The method according to claim 1, wherein said providing step c) and said providing step e) collectively comprises the steps of:
  providing one of said initial first weighting factor and said second weighting factor; and
  calculating the other of said initial first weighting factor and said second weighting factor based on said provided one of said initial first weighting factor and said second weighting factor.

4. The method according to claim 1, further comprising:
  filtering at least one of said first prediction and said second prediction to obtain local contrast information of said at least one of said first prediction and said second prediction; and
  providing said factor modifier based on said local contrast information.

5. The method according to claim 1, further comprising performing at least one of said providing step c) and said providing step e) based on at least one of said first prediction and said second prediction.

6. The method according to claim 1, further comprising selecting said factor modifier from a set of multiple factor modifiers.

7. The method according to claim 3, wherein said providing step comprises providing said one of said initial first weighting factor and said second weighting factor based on a weight identifier associated with said group of image elements.

8. The method according to claim 5, further comprising calculating a difference between said first prediction and said second prediction, said performing step comprises performing at least one of said providing step c) and said providing step e) based on said difference.

9. The method according to claim 8, wherein said performing step comprises providing, based on said difference, at least one of said initial first weighting factor and said second weighting factor from a look-up table defining multiple different weighting factors.

10. The method according to claim 6, wherein said selecting step comprises selecting said factor modifier from a set of multiple factor modifiers based on said first prediction.

11. A method of encoding a group of mage elements in frame of a video sequence, said method comprising the steps of:
  a) estimating a first prediction of said group of image elements, wherein said estimating comprises estimating an intra prediction of said group of image elements based on another of image elements in said frame;
  b) estimating a second prediction of said group of image elements;
  c) defining an initial first weighting factor;
  d) defining a factor modifier to be applied to said initial first weighting factor to generate a first weighting factor comprising multiple factor values, each factor value being associated with an image element position in said group of image elements and said multiple factor values are dependent on their associated relative image element position in said group of image elements, said first weighting factor is to be applied to said first prediction, wherein said defining comprises defining a factor modifier having multiple factor values dependent on a relative image element position in said group of image elements, where a first factor value associated with a first image element position in said group of image elements is larger than a second factor value associated with a second image element position in said group of image elements, said second image element position being further from said another group of image elements in said frame than said first image element position; and
  e) defining a second weighting factor to be applied to said second prediction, wherein said group of image elements being encoded as an identifier of said first prediction, an identifier of said second prediction and an identifier of at least one of said initial first weighting factor and said second weighing factor.

12. The method according to claim 11, wherein said estimating step b) comprises estimating an inter prediction of said group of image elements based on a group of image elements in another frame of said video sequence.

13. The method according to claim 11 wherein said frame comprises multiple macroblocks of image elements and said estimating step b) comprises the steps of:
  finding a suitable macroblock partition constituting said group of image elements; and
  determining an inter prediction of said macroblock partition, and said estimating step a) comprises determining, based on said inter prediction, an intra prediction of said macroblock partition.

14. The method according to claim 11, wherein said group of image elements being encoded as said identifier of said first prediction, said identifier of said second prediction, said identifier of said initial first weighting factor and said identifier of said second weighing factor.

15. The method according to claim 11, further comprising performing at least one of said defining step c) and said defining step e) based on said first prediction and said second prediction.

16. The method according to claim 11, wherein said defining step d) comprising defining said factor modifier based on said first prediction.

17. The method according to claim 11, performing at least one of said defining step c) and defining step e) based on residual data of a neighboring group of image elements in said frame.

18. The method according to claim 15, further comprising calculating a difference between said first prediction and said second prediction, said performing step comprises performing at least one of said defining step c) and said defining step e) based on said difference.

19. The method according to claim 18, further comprising calculating a local spatial difference in said first prediction and said second prediction, said performing step comprises performing at least one of said defining step c) and said defining step e) based on said difference.

20. A decoder comprising:
  a first prediction provider arranged for providing a first prediction of a group of image elements in a frame of an encoded video sequence, wherein said first prediction provider is arranged for providing an intra prediction of said group of image elements based on a decoded version of an encoded group of image elements in said frame;
  a second prediction provider arranged for providing a second prediction of said group of image elements;
  a weight provider arranged for providing an initial first weighting factor and a second weighting factor,
  a weight modifier arranged for generating a first weighting factor comprising multiple factor values by modifying said initial first weighting factor with a factor modifier, each factor values being associated with an image element position in said group of image elements and said multiple factor values are dependent on their associated relative image element position in said group of image elements, wherein said factor modifier is selected to have multiple factor values dependent on a relative image element position in said group of image elements, where a first factor value associated with a first image element position in said group of image elements is larger than a second factor value associated with a second image element position in said group of image elements, said second image element position being further from said encoded group of image elements in said frame than said first image element position;

a first prediction modifier arranged for determining a weighted first prediction based on said first prediction provided by said first prediction provider and said first weighting factor generated by said weight modifier;

a second prediction modifier arranged for determining a second weighted prediction based on said second prediction provided by said second prediction provider and said second weighting factor provided by said weight provider; and an image element generator arranged for generating a decoded version of said group of image elements based on said weighted first prediction and said second weighted prediction.

21. The decoder according to claim 20, wherein said second prediction provider is arranged for providing an inter prediction of said group of image elements based on a decoded version of an encoded group of image elements in another frame of said encoded video sequence.

22. The decoder according to claim 20, wherein said weight provider is arranged for providing one of said first intra weighting factor and said second weighting factor and calculating the other of said initial first weighting factor and said second weighting factor based on said one of said initial first weighting factor and said second weighting factor.

23. The decoder according to claim 20, wherein said weight modifier is arranged for i) filtering at least one of said first prediction and said second prediction to obtain local contrast information of said at least one of said first prediction and said second prediction, and ii) providing said factor modifier based on said local contrast information.

24. The decoder according to claim 20, wherein said weight provider is arranged for providing at least one of said initial first weighting factor and said second weighting factor based on at least one of said first prediction provided by said first prediction provider and said second prediction provided by said second prediction provider.

25. The decoder according to claim 22, wherein said weight provider is arranged for providing said one of said initial first weighting factor and said second weighting factor based on a weight identifier associated with said group of image elements.

26. The decoder according to claim 24, wherein said weight provider is arranged for calculating a difference between said first prediction provided by said first prediction provider and said second prediction provided by said second prediction provider and for providing at least one of said initial first weighting factor and said second weighting factor based on said difference.

27. The decoder according to claim 26, wherein said weight provider is arranged for providing, based on said difference, at least one of said initial first weighting factor and said second weighting factor from a look-up table defining multiple different weighting factors.

28. An encoder comprising:
a first prediction estimator arranged for estimating a first prediction of a group of image elements in a frame of a video sequence, wherein said estimating comprises estimating an intra prediction of said group of image elements based on another group of image elements in said frame;

a second prediction estimator arranged for estimating a second prediction of said group of image elements;

a first factor definer arranged for defining an initial first weighting factor;

a modifier definer arranged for defining a factor modifier to be applied to said initial first weighting factor to generate a first weighting factor comprising multiple factor values, each factor value being associated with an image element position in said group of image elements and said multiple factor values are dependent on their associated relative image element position in said group of image elements, said first weighting factor is to be applied to said first prediction, wherein said defining comprises defining a factor modifier having multiple factor values dependent on a relative image element position in said group of image elements, where a first factor value associated with a first image element position in said group of image elements is larger than a second factor value associated with a second image element position in said group of image elements, said second image element position being further from said another group of image elements in said frame than said first image element position; and a second factor definer arranged for defining a second weighting factor to be applied to said second prediction, wherein said group of image elements being encoded as an identifier of said first prediction, an identifier of said second prediction and an identifier of at least one of said initial first weighting factor and said second weighing factor.

29. The encoder according to claim 28, wherein said frame comprises multiple macroblocks of image elements and said encoder further comprising a partition selector arranged for selecting a suitable macroblock partition constituting said group of image elements, said second prediction estimator is arranged for determining an inter prediction of said macroblock partition, and said first prediction estimator is arranged for determining, based on said inter prediction, an intra prediction of said macroblock partition.

30. The encoder according to claim 28, wherein said first factor definer is arranged for determining said initial first weighting factor based on said estimated first prediction and said second prediction.

31. The encoder according to claim 28, wherein said second factor definer is arranged for determining said second weighting factor based on said estimated first prediction and said second prediction.

* * * * *

UNITED STATES PATENT AND TRADEMARK OFFICE
CERTIFICATE OF CORRECTION

PATENT NO. : 8,457,200 B2
APPLICATION NO. : 12/307861
DATED : June 4, 2013
INVENTOR(S) : Andersson et al.

It is certified that error appears in the above-identified patent and that said Letters Patent is hereby corrected as shown below:

In the Specification

In Column 1, Line 10, delete "tovideo" and insert -- to video --, thereof.

In Column 1, Line 20, delete "predicition" and insert -- prediction --, thereof.

In Column 1, Lines 25-26, delete "predicition" and insert -- prediction --, thereof.

In Column 1, Line 28, delete "predicition" and insert -- prediction --, thereof.

In Column 1, Line 32, delete "predicition" and insert -- prediction --, thereof.

In Column 1, Line 33, delete "bi-predicitions" and insert -- bi-predictions --, thereof.

In Column 1, Line 36, delete "predicition" and insert -- prediction --, thereof.

In Column 9, Lines 2-6, delete "
$$W_2 P_2 = \begin{bmatrix} w_2 q_{11} & w_2 q_{12} & w_2 q_{14} & w_2 q_{14} \\ w_2 q_{21} & w_2 q_{22} & w_2 q_{24} & w_2 q_{24} \\ w_2 q_{31} & w_2 q_{32} & w_2 q_{33} & w_2 q_{34} \\ w_2 q_{41} & w_2 q_{42} & w_2 q_{43} & w_2 q_{44} \end{bmatrix}$$
" and insert --
$$W_2 P_2 = \begin{bmatrix} w_2 q_{11} & w_2 q_{12} & w_2 q_{13} & w_2 q_{14} \\ w_2 q_{21} & w_2 q_{22} & w_2 q_{23} & w_2 q_{24} \\ w_2 q_{31} & w_2 q_{32} & w_2 q_{33} & w_2 q_{34} \\ w_2 q_{41} & w_2 q_{42} & w_2 q_{43} & w_2 q_{44} \end{bmatrix}$$
--, thereof.

In Column 9, Line 60, delete "$q_{ij} + f_{w_1 w_2}(p_{ij} - q_{ij})$" and insert -- $q_{ij} + f_{ijk}(p_{ij} - q_{ij})$ --, thereof.

Signed and Sealed this
Fifteenth Day of October, 2013

Teresa Stanek Rea
*Deputy Director of the United States Patent and Trademark Office*

CERTIFICATE OF CORRECTION (continued)
U.S. Pat. No. 8,457,200 B2

In the Claims

In Column 23, Line 42, in Claim 11, delete "mage" and insert -- image --, therefor.

In Column 23, Line 48, in Claim 11, delete "another" and insert -- another group --, therefor.